United States Patent
Le Carvennec

(10) Patent No.: US 6,452,886 B1
(45) Date of Patent: Sep. 17, 2002

(54) ANTIHACKING OPTICAL RECORDING DISC AND METHOD FOR READING SAME

(75) Inventor: François Le Carvennec, Senlisse (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/600,887

(22) PCT Filed: Dec. 10, 1999

(86) PCT No.: PCT/FR99/03103

§ 371 (c)(1),
(2), (4) Date: Aug. 15, 2000

(87) PCT Pub. No.: WO00/36601

PCT Pub. Date: Jun. 22, 2000

(30) Foreign Application Priority Data

Dec. 15, 1998 (FR) .............................. 98 15833

(51) Int. Cl.[7] .................................. G11B 7/00
(52) U.S. Cl. ................. 369/53.21; 369/275.3
(58) Field of Search .......... 369/53.21, 53.22, 369/53.2, 111, 275.3, 275.4, 47.12, 47.14, 47.22, 59.23; 380/201, 207, 208, 252, 279, 283, 284; 713/194, 200, 201; 705/1, 57

(56) References Cited

U.S. PATENT DOCUMENTS

| | | |
|---|---|---|
| 3,774,043 A | 11/1973 | Le Carvennec |
| 3,909,608 A | 9/1975 | Le Merer et al. |
| 3,912,922 A | 10/1975 | Lacotte et al. |
| 3,919,698 A | 11/1975 | Bricot et al. |
| 4,001,563 A | 1/1977 | Bied-Charreton et al. |
| 4,001,564 A | 1/1977 | Bied-Charreton et al. |
| 4,001,635 A | 1/1977 | D'Auria et al. |
| 4,037,251 A | 7/1977 | Bricot et al. |
| 4,038,524 A | 7/1977 | Puech et al. |
| 4,068,258 A | 1/1978 | Bied-Charreton et al. |
| 4,142,208 A | 2/1979 | Oprandi et al. |
| 4,157,931 A | 6/1979 | Bricot et al. |
| 4,176,277 A | 11/1979 | Bricot et al. |
| 4,253,115 A | 2/1981 | Kergozien et al. |
| 4,387,452 A | 6/1983 | Bricot et al. |
| 4,405,862 A | 9/1983 | Bricot et al. |
| 4,551,733 A | 11/1985 | Cornet et al. |
| 4,868,804 A | 9/1989 | Le Carvennec et al. |
| 5,475,672 A | 12/1995 | Le Carvennec |
| 5,680,386 A | 10/1997 | Le Carvennec et al. |
| 5,761,301 A * | 6/1998 | Oshima et al. ............. 380/201 |
| 5,787,068 A * | 7/1998 | Arps et al. ................ 369/53.21 |
| 5,790,489 A * | 8/1998 | O'Connor ................ 369/53.21 |
| 5,864,526 A | 1/1999 | Le Carvennec |
| 6,091,697 A | 7/2000 | Le Carvennec et al. |
| 6,151,281 A * | 11/2000 | Van Der Enden et al. ............ 369/275.3 |
| 6,256,738 B1 * | 7/2001 | Sinquin et al. ............. 713/194 |
| 6,359,844 B1 * | 3/2002 | Frank ....................... 369/53.41 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

A pirate-proof optical recording disc and a process for reading such a disc. The disc includes a spiral main track and a secondary track span interposed between two successive turns of the main track. An initialization zone includes a datum regarding the nature of the pirate-proof disc and a datum for relative positioning of the span, to which the reader goes by travelling to an address of the main track and by effecting a track jump. The span is identified by an identification datum which it carriers and a check is then made as to whether the physical structure of the disc complies with that described in the initialization zone. The process applies to the pirate-proofing of any optical disc, especially of CD or DVD format.

11 Claims, 2 Drawing Sheets

ANTIHACKING OPTICAL RECORDING DISC AND METHOD FOR READING SAME

BACKGROUND OF THE INVENTION

1. Field of the Invention

The invention relates to a pirate-proof optical recording disc and to a process for reading such a disc. The invention can in particular be applied to CD or DVD format optical discs but it also extends to any other format.

2. Discussion of the Background

Owing to the appearance on the market of low-cost CD type recorders (CD-R or CD-RW and soon DVD burners), duplication, especially of CD-ROMs or DVD-ROMs, has become or will become accessible to semi-professionals or to amateurs. It is therefore very important for publishers, in particular publishers of software or of games, to protect themselves against the pirating of their information, especially if such pirating is on an industrial scale.

There are already a few systems which make the copying of data and/or their use more difficult. These systems are in particular based on encryption techniques. However, their effectiveness is limited since, with the computer means available to potential pirates, the "hacking" of these systems is far from impossible.

SUMMARY OF THE INVENTION

The subject of the invention is a pirate-proof disc and a method of reading barring unauthorized use of the datum stored and in particular the use of pirate copies by virtue of the use of a disc having a specific physical configuration. The disc of the invention can be read by a conventional reader, without modification. However, its structure renders any copy made by easily accessible means unusable and the structure of the disc cannot be simulated. Moreover, the reproduction of such a disc cannot be done without very sophisticated and extremely expensive industrial means.

According to the invention, there is provided an optical data recording disc comprising a continuous main recording track recorded in a known general manner in the form of a spiral comprising a plurality of successive turns, characterized in that the disc comprises, furthermore, at least one secondary track span interposed between two adjacent spiral turns, the said span carrying at least one identification datum specific to the said span, a first datum regarding the pirate-proof nature of the disc and a second datum regarding the positioning of the secondary track span with respect to the main track, the said first and second data being arranged in a zone for initializing the reading of the disc on the main track.

According to another aspect of the invention, there is provided a process for reading the above disc, characterized in that it comprises the steps of:

a) reading the data arranged on the main track in the said initialization zone;

b) checking that the physical structure of the disc complies with that described by the data of the initialization zone;

c) authorizing the use of the data carried by the main track and the operation of the corresponding application only when the result of the check step b) is positive.

BRIEF DESCRIPTION OF THE DRAWINGS

The invention will be better understood and other characteristics and advantages will emerge with the aid of the description hereinbelow and of the enclosed drawings in which.

DISCRIPTION OF THE PREFERRED EMBODIMENTS

On an optical disc, in a conventional manner, the data are written to a spiral-shaped track. The reader follows this spiral in order to retrieve the data. The latter are in general grouped in blocks recorded in sectors identified by addresses. A table of contents (TOC) which allocates the blocks or sectors to the various files is recorded on the medium.

According to the invention, there is provision to interpose between two (or more) adjacent turns of the main track a secondary track span parallel to the main track.

Figure 1:
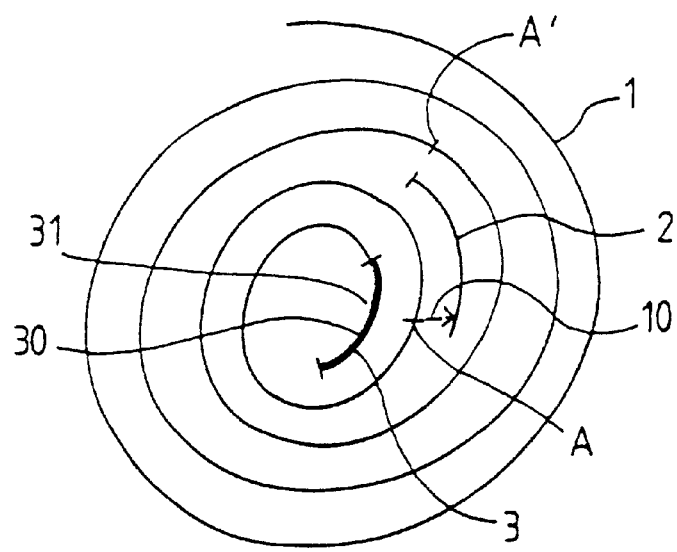
FIG. 1 is the diagram of a first embodiment of a disc according to the invention.

FIG. 1 shows an exemplary embodiment. A main spiral track 1 is provided on the disc. This track is provided so as to carry the datum in a conventional manner, for example in accordance with the specifications of CD or DVD discs.

A secondary track span 2 is interposed between two consecutive turns of the main track 1. Here, the length of this span is assumed to be markedly less than one turn of the track. This span is arranged with a standard separation between the turns of the main track, that is to say the intertrack separation with the adjacent turns of the main track is equal to the standard separation between two normal adjacent turns of the main track. It may be seen that at the level of the secondary track span, the main track attains a double spacing; the linkup between the standard gap and the double gap must be effected progressively so that a normal reader is not caused to jump track.

The disc comprises on the main track an initial zone 3, loading zone or TOC or else so-called "boot" zone, which comprises a first datum 30 regarding the pirate-proof nature of the disc and a second datum 31 regarding the positioning of the secondary track span 2 with respect to the main track. For example, the datum 31 will indicate the address A on the main track as well as the indication of a rightward track jump 10 which will allow the reader to go to the start of the span 2. The datum 31 can also comprise the indication of the length of the span (or of the end address).

The span 2 comprises at least one recorded datum for identifying the said span. This span can also comprise other data useable in pirate-proofing protection.

The manner of operation in respect of the reading of this disc is as follows. The reader begins reading in the same way as for a conventional disc; it necessarily centres itself on the main track, even if it momentarily passes via the secondary track span and goes to the initialization zone 3. There it reads the data 30 and 31. Hence, this implies that the operation of the application and the use of the datum on the main track will be authorized only after checking that the physical structure of the disc does indeed comply with that described in zone 3, which has indicated that a pirate-proof disc is involved and that a span 2 was located at the positioning (start, length) determined by the datum 31.

The reading process according to the invention provides for several possible methods of abovementioned checking. In all cases, the first step consists in going to the start of the secondary track span 2 and in checking the presence of the span-specific identification datum.

A first possibility for this step is to indicate the address A on the main track facing the start of the span 2 and the direction of the jump of one track to be performed (here to the right in FIG. 1). However, it would also be possible to go to the address A+1 turn and perform a jump to the left.

It is thereafter necessary to make certain that the pirate-proof disc and its physical structure have not been simulated. To do this, a first method can consist in having the reader read, after the address A, a complete turn of main track plus the envisaged length of the span 2 (for example up to the address A'). If the identification datum for the span 2 has not been found, it is because the disc does indeed have the stated physical structure. Indeed, if one wished to simulate the span 2 on the main track, one would necessarily encounter this span onward of the address A+1 turn.

It is clear that this check can be performed at the start of the use of the disc and also in a random manner during the use of the disc, thereby further increasing the difficulty of copying the disc by simulating its structure.

To further improve the pirate-proofing security, it is possible, as has already been mentioned, to indicate with the datum 31 the length of the span 2. Indeed, one could conceive of manufacturing recordable discs with at least one length of virgin secondary track covering one or more spiral turns at the start of the disc or even, if there is no problem with capacity, provide a secondary spiral track over the entire disc. A pirate would then be able to copy the pirate-proof disc completely and arrange the span 2 in the correct place on the virgin secondary track. In this case, if one stops at the single check described above, one would not notice that one is faced with a copy.

Also, provision may be made to check furthermore the length of the span by observing whether or not there is an unrecorded secondary track portion following the span 2.

This can be done for example by checking that at the indicated end of the span, the reader alights immediately on the main track (to the right or to the left of the span) with the envisaged addresses. It is also possible to carry out an operation consisting in going to the address A' corresponding, on the main track, to the position of the end of the span 2, then to perform a track jump (here leftward) and to check that one does indeed alight on the main track and not on a secondary track extension.

Figure 2:
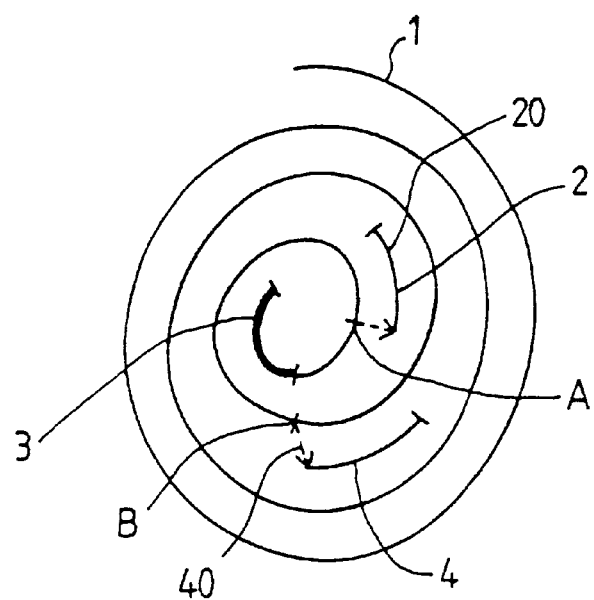
FIG. 2 represents a variant of the disc of FIG. 1.

FIG. 2 represents a variant which makes it even more difficult to pirate a disc. Found once again in this figure are the main track 1, the initialization zone 3 and the first secondary track span 2. However, there is provided a second secondary track span 4 interposed in another position between two (or more) turns of main track. The positioning datum 20 for this second span 4 is carried by the first span 2. Thus, this datum is relatively hidden.

After the reader has accessed the span 2 as envisaged above, it reads the datum 20 so as to go to the span 4, for example in the same way as before by going to the address B then by performing a rightward track jump 40.

Figure 3:
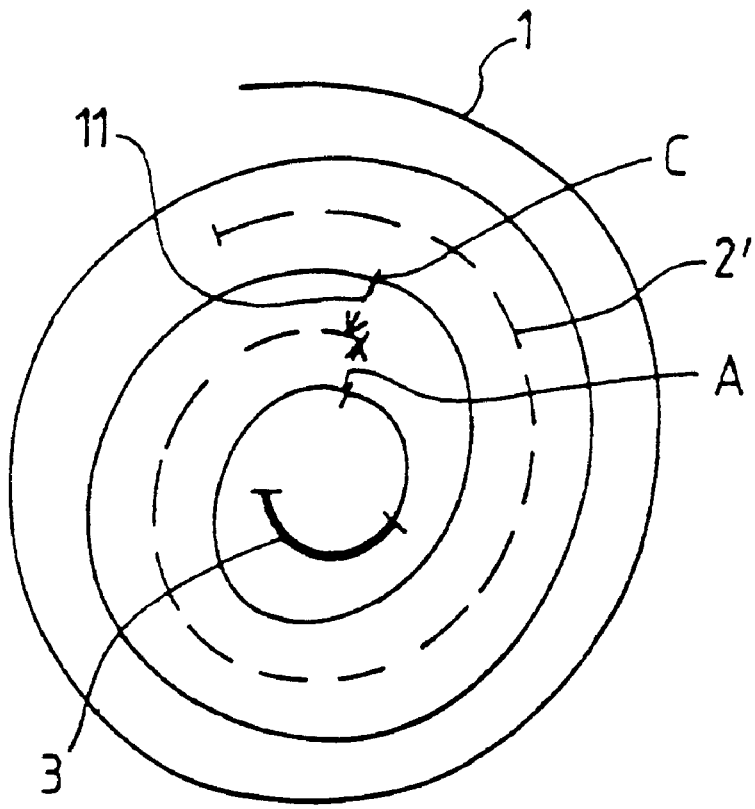
FIG. 3 is another variant in which the secondary track portion is assumed to occupy more than one turn on the disc.

FIG. 3 illustrates another embodiment where the secondary track span 2' has a length greater than one complete turn. This does not change anything in the process described above.

However, whilst describing this other embodiment, it is possible to describe another method of checking the physical structure of the disc. To do this, based on the data read from the zone 3, one goes to the address A then one performs a rightward jump of one track so as thereafter to read the span 2' and its identification datum. The physical structure of the disc can then be checked by going to the address C=A+1 turn on the main track, by performing a leftward jump and by thereafter checking via the identification datum that one is indeed again reading the span 2'.

It is clear that the pirate-proofing protection can be further improved by recording on the secondary track span or spans, data other than the identification datum. In particular, it is possible to introduce encryption techniques (authorization key, etc).

The advantages of the invention are numerous. The datum of the main track is read in a transparent manner by standard readers. One uses only basic access/reading functions of the reader, which are actuated prior to or during the running of the application and the use of the disc's data. This leads to good compatibility with the standard means of implementation of drives and application processes and additional difficulty in simulating operation with copied discs, insofar as it is more difficult to identify recourse to the use of the identification of the disc when this recourse occurs during the programme of use.

The effectiveness of the pirate-proofing according to the invention is all the greater as the General Public users of present-day recorders cannot implement the structure described. Furthermore, the positioning and the length of the secondary track span or spans being able to vary from one type of disc to another, it is not possible to produce special recordable discs intended for the pirate copying of the discs according to the invention.

Finally, the mass duplication of pirate copies (pressing) is not within the scope of a simple industrial pirate since it requires specific means corresponding to very considerable investment such as twin-beam mastering machines.

What is claimed is:

1. Optical data recording disc comprising a continuous main recording track recorded in a known general manner in the form of a spiral comprising a plurality of successive turns, characterized in that the disc comprises, furthermore, on the one hand at least one secondary track span interposed between adjacent spiral turns, the said span carrying at least one specific identification datum, on the other hand a first datum regarding the pirate-proof nature of the disc and a second datum regarding the positioning of the secondary track span or spans with respect to the main track as well as an indication characteristic of the length of the span or spans, the said first and second data being arranged in a zone for initializing the reading of the disc on the main track.

2. Disc according to claim 1, characterized in that the said secondary track span is arranged between the adjacent spiral turns with a separation with respect to each of them which is equal to the standard separation between any two successive spiral turns.

3. Disc according to claim 1, characterized in that the said secondary track span furthermore carries data which can be used within the course of the running of the application stored on the said main track.

4. Disc according to claim 1, characterized in that the disc furthermore comprises at least one second secondary track span interposed at another positioning between consecutive spiral turns, the said second span carrying at least one identification datum specific to the said second span, and in that the first secondary track span furthermore carries at least one third datum regarding the positioning of the said second span with respect to the main track.

5. Process for reading an optical data recording disc comprising a continuous main recording track recorded in a known general manner in the form of a spiral comprising a plurality of successive turns, the disc comprising, furthermore, on the one hand at least one secondary track span interposed between adjacent spiral turns, the said span carrying at least one specific identification datum, on the other hand a first datum regarding the pirate-proof nature of the disc and a second datum regarding the positioning of the secondary track span with respect to the main track, the said first and second data being arranged in a zone for initializing the reading of the disc on the main track, the said process being characterized in that it comprises the steps of:

a) reading the data arranged on the main track in the said initialization zone;

b) checking that the physical structure of the disc complies with that described by the data of the initialization zone;

c) authorizing the use of the data carried by the main track and the operation of the corresponding application only when the result of the check of step b) is positive.

6. Process according to claim 5, characterized in that the said step b) consists in:

b1) using the said second positioning datum to access the said secondary track span;

b2) checking the presence of the said span-specific identification datum;

b3) checking that the said span is not an element of the main track.

7. Process according to claim 6 for reading a disc, characterized in that the said step b3) for checking that the said span is not an element of the main track is performed on the basis of the said second positioning datum and of the aid indication characteristic of the span length.

8. Process according to claim 6, characterized in that the access according to step b1) to the said secondary track span is performed by accessing a predetermined address of the said main track provided by the said second datum and by performing a jump of one track in the direction indicated by the said second datum.

9. Process according to claim 7, characterized in that the check according to step b3) is performed by reading at least one complete turn of the main track, starting from the address facing the said span plus the space which the data carried by the said span would occupy and by checking that the said identification datum is not encountered.

10. Process according to claim 8, characterized in that the check according to step b3) is performed by effecting a complete turn of the main track, starting from the address facing the said span, then by effecting a jump of one track in the opposite direction to the jump performed in step b1), finally by checking the presence of the said span-specific identification datum.

11. Process according to claim 7, characterized in that the said process furthermore comprises a step of checking the absence of secondary track after the end of the said span.

* * * * *